United States Patent
Albrich

(10) Patent No.: US 6,360,669 B1
(45) Date of Patent: Mar. 26, 2002

(54) INSTALLATION FOR MOVING PERSONS FROM A MOUNTAIN STATION INTO A VALLEY STATION

(75) Inventor: Reinhard Albrich, Dornbirn (AT)

(73) Assignee: Innova Patent GmbH, Wolfurt (AT)

(*) Notice: Subject to any disclaimer, the term of this patent is extended or adjusted under 35 U.S.C. 154(b) by 0 days.

(21) Appl. No.: 09/488,741

(22) Filed: Jan. 20, 2000

(30) Foreign Application Priority Data

Feb. 4, 1999 (AT) .................................................. 145/99

(51) Int. Cl.$^7$ ............................................. E01B 25/22
(52) U.S. Cl. ............................ 104/93; 104/89; 104/91; 104/173.2; 104/173.1
(58) Field of Search .................. 104/173.1, 173.2, 104/112, 178, 184, 191, 196, 197, 180, 93, 113, 117, 89, 91, 123, 124, 125; 105/77, 78; 188/164, 165, 161

(56) References Cited

U.S. PATENT DOCUMENTS

| | | | | |
|---|---|---|---|---|
| 2,781,001 A | * | 2/1957 | Davino | 104/112 |
| 3,604,361 A | * | 9/1971 | Harbert | 104/123 |
| 3,696,890 A | * | 10/1972 | Armstrong | 104/93 |
| 3,723,795 A | * | 3/1973 | Baermann | 188/165 |
| 3,858,520 A | * | 1/1975 | Patin | 104/112 |
| 3,861,318 A | * | 1/1975 | Massa | 104/113 |
| 3,902,432 A | * | 9/1975 | Shortridge et al. | 104/93 |
| 4,069,765 A | * | 1/1978 | Muller | 104/112 |
| 4,149,471 A | * | 4/1979 | Tauzin et al. | 104/173.1 |
| 4,359,946 A | * | 11/1982 | Marvin | 104/93 |
| 4,423,685 A | * | 1/1984 | Kerckhoff | 104/93 |
| 4,523,525 A | * | 6/1985 | Foster | 104/173.1 |
| 4,545,575 A | * | 10/1985 | Forjot | 104/91 |
| 4,590,863 A | * | 5/1986 | Lozen | 104/173.1 |
| 4,957,047 A | * | 9/1990 | Feuz et al. | 104/112 |
| 5,158,021 A | * | 10/1992 | Matsui et al. | 104/93 |
| 5,515,789 A | * | 5/1996 | Brochand et al. | 104/173.1 |
| 5,655,457 A | * | 8/1997 | Sherman et al. | 104/123 |
| 5,660,113 A | * | 8/1997 | Lehotsky | 104/113 |
| 5,862,891 A | * | 1/1999 | Kroger et al. | 188/165 |
| 6,062,350 A | * | 5/2000 | Spieldiener et al. | 188/161 |

OTHER PUBLICATIONS

Published International Application No. 98/36811 (Proske), dated Aug. 27, 1998.

* cited by examiner

*Primary Examiner*—S. Joseph Morano
*Assistant Examiner*—Lars A. Olson
(74) *Attorney, Agent, or Firm*—Herbert L. Lerner; Laurence A. Greenberg; Werner H. Stemer

(57) ABSTRACT

The installation for moving persons from a mountain station to a valley station has a supporting cable which is guided via supporting pylons or the like. Carriages, to which there are attached transport assemblies, can be displaced along the supporting cable. Each transport assembly accommodates at least one person. The transport assembly may be a cabin, a chair, a supporting harness, or the like. A supporting and guide rail is fastened on the supporting cable and the carriage can be displaced along the supporting and guide rail from the mountain station into the valley station.

15 Claims, 4 Drawing Sheets

FIG.2
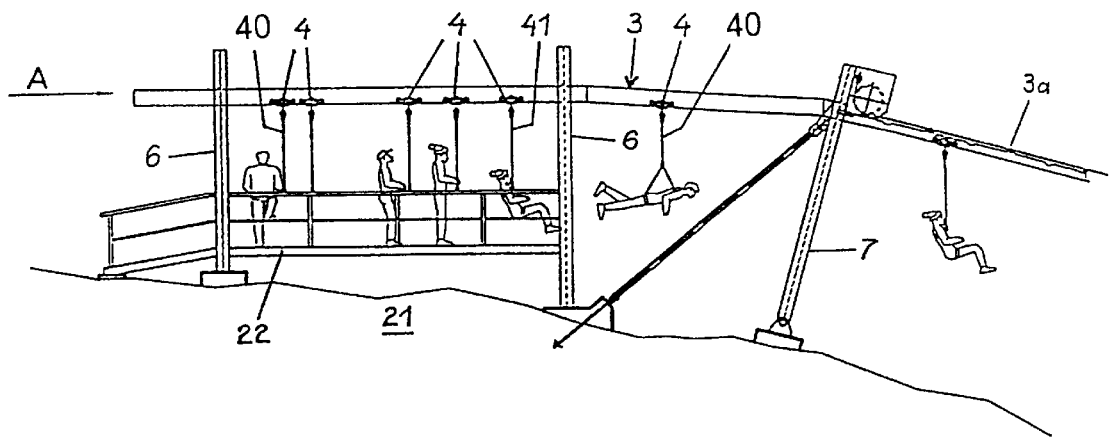
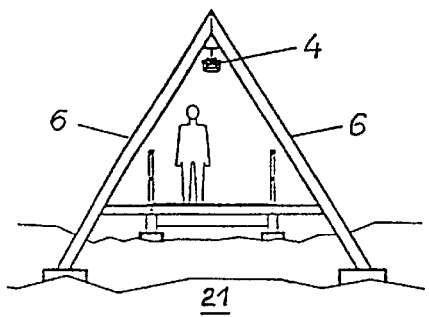
FIG.2a
FIG.2b
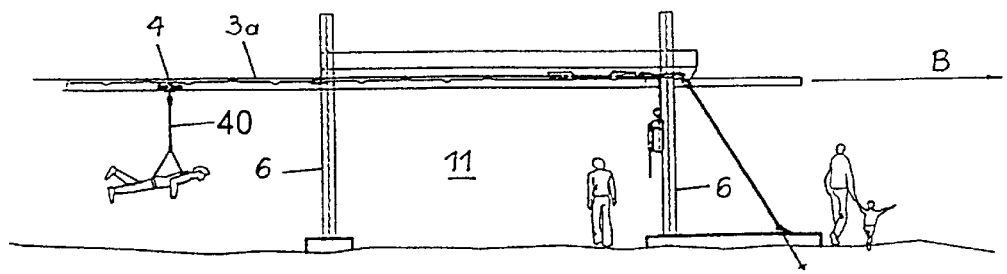

INSTALLATION FOR MOVING PERSONS FROM A MOUNTAIN STATION INTO A VALLEY STATION

BACKGROUND OF THE INVENTION

Field of the Invention

The present invention relates to an installation for moving persons from a mountain station into a valley station. The installation has a supporting cable, which is guided via supports, and carriages that can be displaced along the supporting cable. An arrangement is fastened on the carriages for accommodating at least one person for transport. The transport arrangement may be a cabin, a chair, a supporting harness, or the like.

An installation of this generic type is known from the international PCT publication WO 98/36811. There, between a valley station and a mountain station there is arranged, on the one hand, a haulage cable, which can convey transporting means, e.g. carriages provided with a supporting harness, to the mountain station, and, on the other hand, a rail which is borne by supports and along which the carriages can descend from the mountain station to the valley station.

The published document, however, only discloses such an installation in diagrammatic terms, whereas design details which are critical for erecting such an installation, and operating it safely, are not disclosed.

SUMMARY OF THE INVENTION

The object of the present invention is thus to provide an installation which is intended for moving persons from a mountain station into a valley station and satisfy the design and safety requirements.

With the foregoing and other objects in view there is provided, in accordance with the invention, an installation for moving persons from a mountain station into a valley station, comprising:

- a supporting cable extending from a mountain station to a valley station;
- a carriage displaceably disposed along the supporting cable;
- a transport assembly, such as a cabin, a chair, or supporting harness, or the like, for accommodating at least one person attached to the carriage; and
- a supporting and guide rail fastened on the supporting cable along which the carriages can be displaced from the mountain station to the valley station.

In accordance with an added feature of the invention, a plurality of pylons support the supporting cable between the mountain station and the valley station.

In accordance with an additional feature of the invention, the supporting and guide rail is a T-shaped rail having a vertical web with a top end fastened on the supporting cable and legs laterally projecting from the vertical web. The laterally projecting legs form a running surface for the carriage.

In accordance with another feature of the invention, brackets fastened at the top end of the vertical web of the T-shaped rail enclose the supporting cable and they are displaceably disposed with respect to the supporting cable.

In accordance with a further feature of the invention, eddy-current brakes are disposed along the supporting and guide rail for controlling a speed of the carriages moving along the supporting and guide rail.

In accordance with again an added feature of the invention, a number of strips of magnetically non-conducting material are fastened on the supporting and guide rail at locations of the installation along the rail at which the carriages are to be braked. The strips may be formed of copper, aluminum, and/or high-grade, stainless steel.

In accordance with again an additional feature of the invention, the carriage comprises at least four running rollers disposed to roll on the legs of the T-shaped rail and at least two mating rollers adapted to roll on an underside of the legs opposite from the running rollers. Furthermore, four guide rollers may be provided to roll on the vertical web of the T-shaped rail.

In accordance with again another feature of the invention, the supporting and guide rail is formed of a multiplicity of individual rail sections that are interconnected with brackets.

In accordance with again a further feature of the invention, the supporting and guide rail is disposed in straight segments and curved segments between the mountain station and the valley station. The strips of magnetically non-conducting material are fastened on the supporting and guide rail at locations upstream of the curved segments in a travel direction from the mountain station to the valley station. And the carriage carries at least one permanent magnet adapted to interact with the strips for braking the carriages upstream of the curved segments of the supporting and guide rail.

In accordance with yet an added feature of the invention, deflecting rollers support the supporting cable in the curved segments of the supporting and guide rail. In this case, a plurality of pylons support the supporting cable via the deflecting rollers, and struts attach the supporting and guide rail to the supporting pylons.

In accordance with a concomitant feature of the invention, a plurality of struts support the supporting and guide rail on the supporting pylons in the curved segments.

Other features which are considered as characteristic for the invention are set forth in the appended claims.

Although the invention is illustrated and described herein as embodied in an installation for moving persons from a mountain station into a valley station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a side view of the mountain station of the installation;

FIG. 2a is an end view of a support;

FIG. 2b is a side view of the valley station of the installation;

DESCRIPTION OF THE PREFERRED EMBODIMENTS

Figure 1:
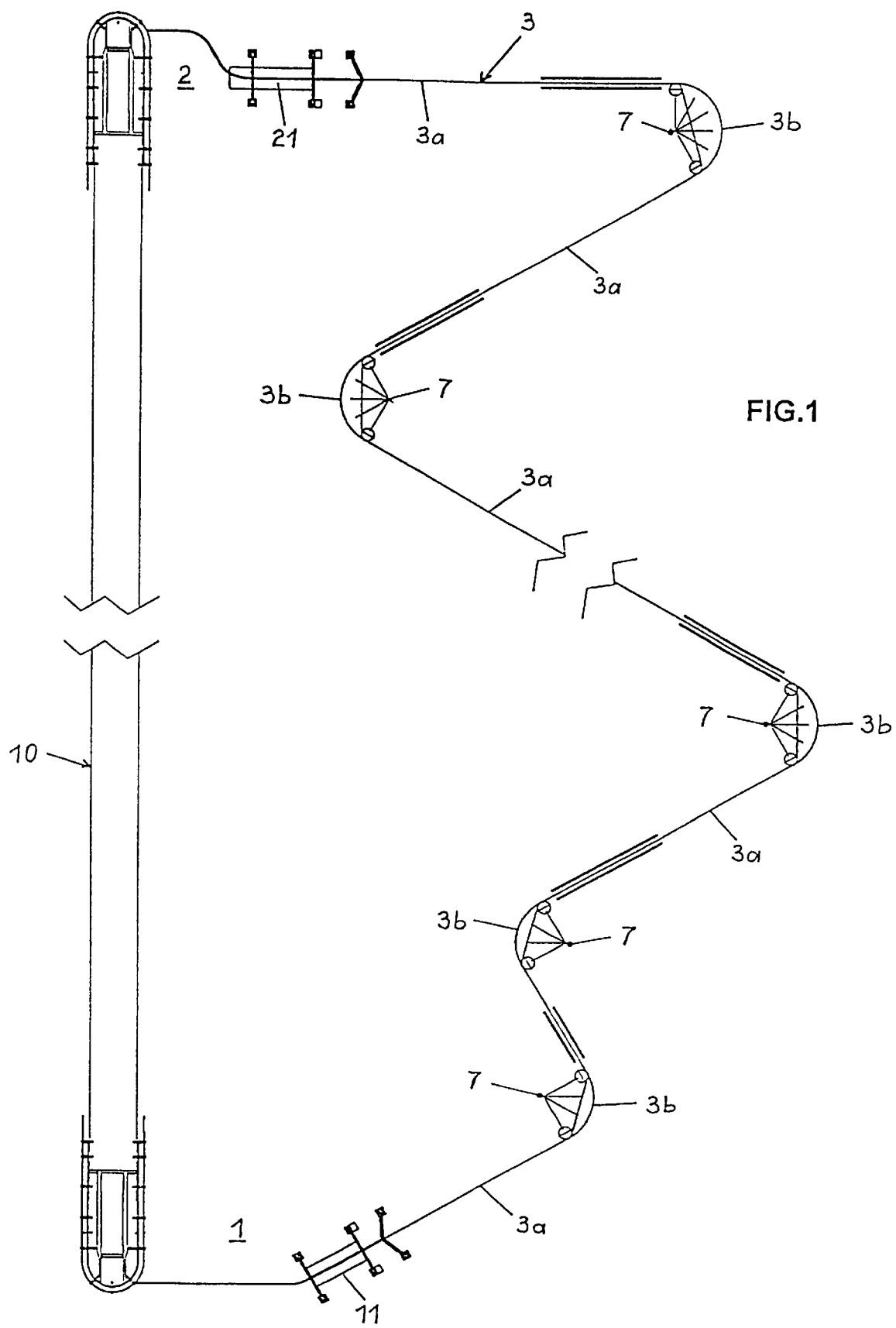
FIG. 1 is a schematic plan view of such an installation.

Referring now to the figures of the drawing in detail and first, particularly, to FIG. 1 thereof, there is seen an installation which is intended for moving persons from a mountain station into a valley station. The installation includes a conveying assembly 10 which is located between a valley station 1 of the installation and a mountain station 2 of the installation and is intended for carriages by means of which individuals can be moved from the valley station 1 to the mountain station 2. The conveying assembly is formed, for example, by an inclined lift or by a supporting and haulage cable to which the carriages can be coupled.

Since this part of the installation may be designed in any desired manner and does not form a constitute part of the invention, it will not be explained in any more detail.

Running from the mountain station 2 is a downwardly sloping rail 3 which is borne by supports and pylons, is located at a distance from the ground and has rectilinear segments 3a and curved segments 3b, supporting pylons 7 being provided at least in the regions of the curved segments 3b and having the rail 3 fastened on them. A boarding location 21 is located in the mountain station 2 and a disembarking location 11 is located in the valley station 1. At the boarding location 21, a carriage with at least one passenger moves onto the rail 3. The carriage then descends by gravity along the rectilinear segments 3a and the curved segments 3b of the rail 3, without additional drive, to the disembarking location 11, which is located in the valley station 1.

Referring now to FIGS. 2 and 2a, there is shown the design of the boarding location 21. At the boarding location 21, the guide rail 3, which is borne by supports 6, is aligned more or less horizontally. Carriages 4 are fed along the guide rail 3 in the direction of the arrow A and are provided with a supporting harness 40 which serves to accommodate passengers who pass into the boarding location 21 via a ramp 22. The more or less horizontal section of the rail 3 is adjoined by downwardly inclined sections, as a result of which the carriages 4 begin to descend to the valley station. In this region, the guide rail 3 is borne by pylons 7.

At the disembarking location 11, which is illustrated in FIG. 2b, the guide rail, once again, is designed with horizontal segments 3a, in which the carriages 4 are decelerated to the extent that the passengers can alight from them. Thereafter, the carriages 4 are moved in the direction of the arrow B to the conveying assembly 10, by means of which they are transported to the mountain station 2.

Figure 3:
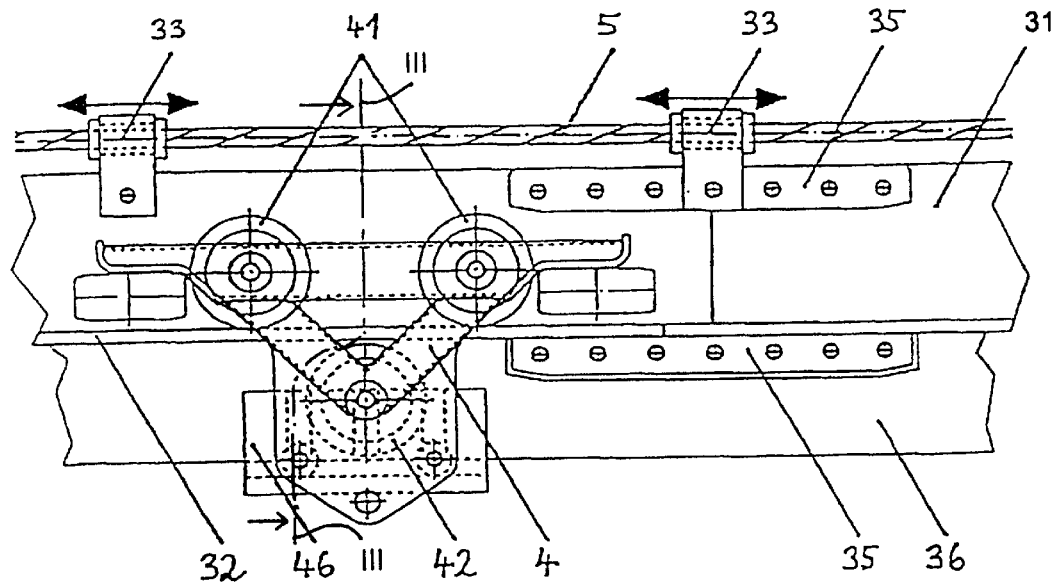
FIG. 3 is a side view of the supporting and guide rail and a carriage.
Figure 3A:
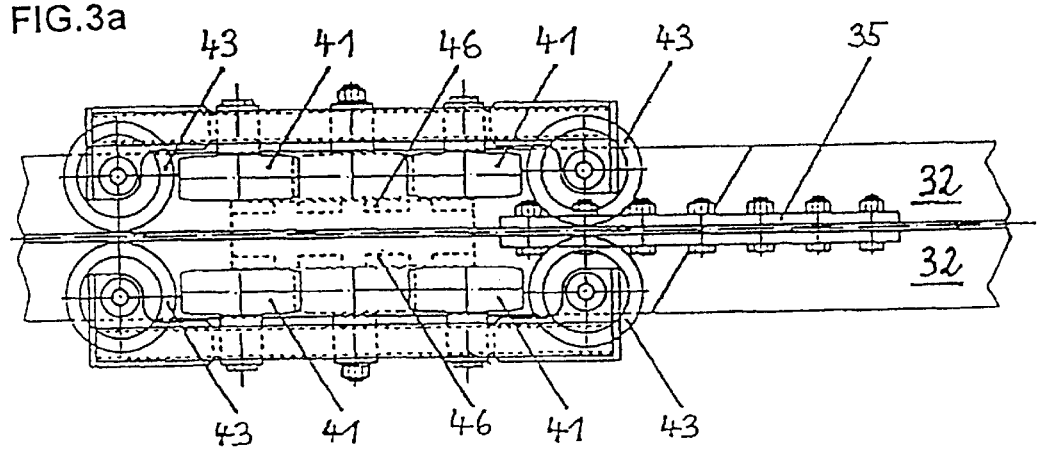
FIG. 3a is a plan view of the supporting and guide rail and a carriage.
Figure 3B:
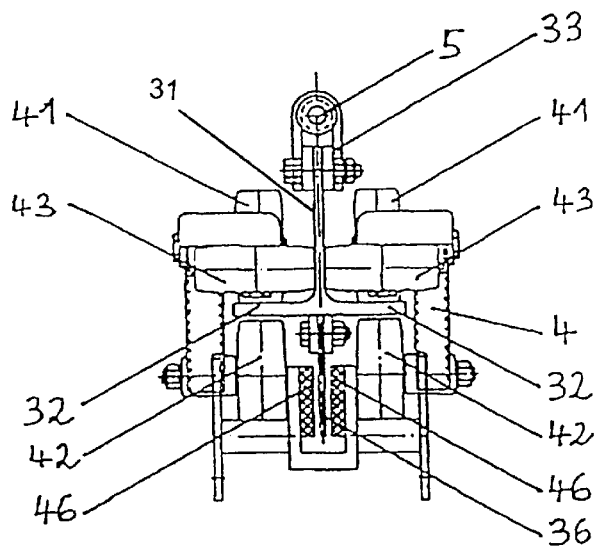
FIG. 3b is a section taken along the line III—III of FIG. 3.

The designs of the supporting and guide rail 3 and of the carriages 4 and also the fastening of the supporting and guide rail 3 will now be explained with reference to FIGS. 3, 3a and 3b.

A cable 5 serves to fasten the rail 3. The cable 5 is anchored firmly in the mountain station 2, is guided over deflecting rollers and supporting rollers, mounted on the supporting pylons 7, and is prestressed in the valley station 1 by means of a tensioning apparatus. The supporting and guide rail 3 is of T-shaped design in cross section. A more or less vertically aligned, central web 31 is fastened on the cable 5 by means of U-shaped brackets 33. The brackets 33 can be displaced with respect to the cable 5. Both central web 31 and the two legs 32, which project transversely therefrom, of the T-shaped rail 3 serve as guide tracks for the rollers 41 of the carriage 4. Furthermore, the individual sections of the rail 3 are connected to one another by means of brackets 35.

The carriages 4 are equipped with two pairs of running rollers 41, which roll on the top side of the two legs 32, a pair of mating rollers 42, which roll on the underside of the two legs 32, and two pairs of guide rollers 43, which roll on the two side surfaces of the web 31.

Provided on the rail 3, in order to control the speed at which the carriages 4 descend along the rail 3, are strips 36 which are made of magnetically non-conducting material, in particular of copper, of aluminum or high-grade steel (e.g. stainless steel), are arranged, in particular, upstream of curved segments 3b of the supporting and guide rail 3 and are assigned permanent magnets 46 arranged on the carriages 4. Along with the strips 36 made of non-conducting material, the permanent magnets 46 fulfill the function of eddy-current brakes, the action of which is directly proportional to the speed of the carriages 4. As a result, the speed of the carriages 4 descending along the supporting and guide rail 3 is controlled such that a reliable maximum speed is not exceeded, this ensuring the safety of the passengers. The braking strength of the eddy-current brakes is advantageously adjusted as a function of the steepness of the installation and the desired maximum speed. Similarly, the length of the strips 36 and their positioning is also adapted to the specific layout of the installation.

Figure 4:
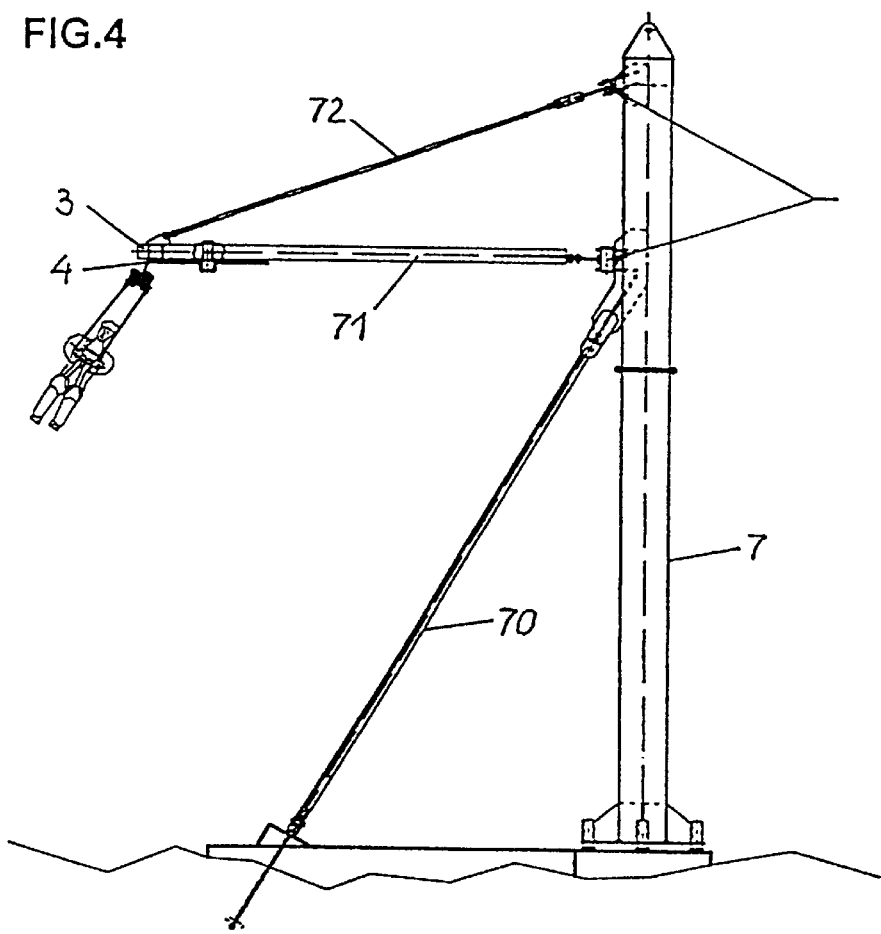
FIG. 4 shows a side view of a supporting pylon arranged along the path taken by the rail.
Figure 4A:
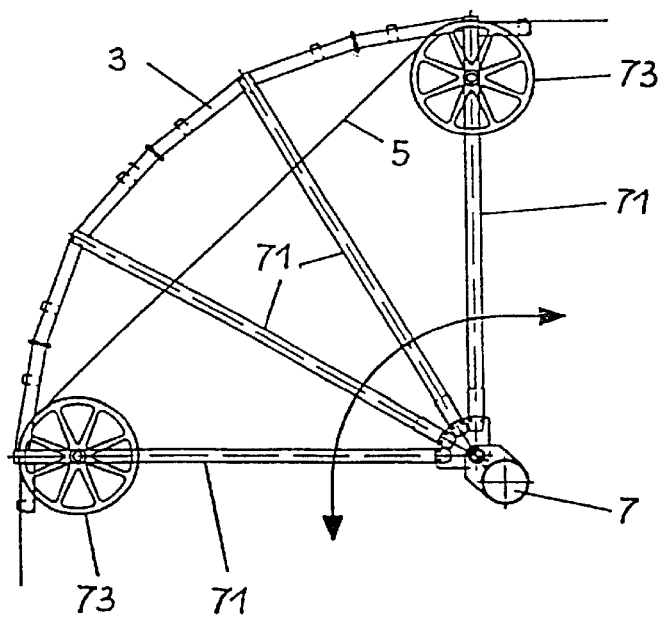
FIG. 4a is a plan view of the supporting pylon of FIG. 4.

As can be seen from FIGS. 4 and 4a, provided in the region of the curved segments 3b of the guide rail 3 are supporting pylons 7 which are designed with a plurality of more or less horizontally projecting struts 71 which are distributed over the curvature and by means of which the supporting and guide rail 3 is supported radially. The struts 71 are supported by means of struts 72. Mounted on the two outer struts 71 are guide rollers 73 over which the supporting cable 5 is guided and deflected. In order to ensure that the struts 71 can move to the necessary extent, the struts are articulated on the supporting pylons 7 such that they can be pivoted about vertical axes. The pylons 7 are additionally supported by obliquely inclined struts 70.

I claim:

1. An installation for moving persons from a mountain station into a valley station, comprising:

a supporting cable extending from a mountain station to a valley station;

a supporting and guide rail having fastened thereon a plurality of brackets, said brackets enclosing said supporting cable, being displaceably disposed with respect to said supporting cable, and mounting said supporting and guide rail to said supporting cable;

a carriage displaceably supported on said supporting and guide rail and displaceable from the mountain station to the valley station; and a transport assembly for accommodating at least one person attached to said carriage.

2. The installation according to claim 1, which further comprises a plurality of pylons supporting said supporting cable between the mountain station and the valley station.

3. The installation according to claim 1, wherein said transport assembly is selected from the group consisting of a cabin, a chair, and a supporting harness.

4. The installation according to claim 1, wherein said supporting and guide rail is a T-shaped rail having a vertical web with a top end fastened on said supporting cable and legs laterally projecting from said vertical web, said legs forming a running surface for said carriage.

5. The installation according to claim 1, which further comprises eddy-current brakes disposed along said supporting and guide rail for controlling a speed of said carriages moving along said supporting and guide rail.

6. The installation according to claim 1, which further comprises strips of magnetically non-conducting material fastened on said supporting and guide rail at locations of the installation along said rail at which said carriages are to be braked, and permanent magnets disposed on said carriages for interacting with said strips.

7. The installation according to claim 6, wherein said magnetically non-conducting material of said strips is selected from the group consisting of copper, aluminum, and high-grade steel.

8. The installation according to claim 1, wherein said supporting and guide rail is a T-shaped rail having a vertical web and legs laterally projecting from said vertical web and forming a running surface for said carriage, said carriage comprising at least four running rollers disposed to roll on said legs of said T-shaped rail and at least two mating rollers adapted to roll on an underside of said legs opposite from said running rollers.

9. The installation according to claim 1, wherein said carriage further comprises four guide rollers adapted to roll on said vertical web of said T-shaped rail.

10. The installation according to claim 1, wherein said supporting and guide rail is formed of a multiplicity of individual, interconnected rail sections.

11. The installation according to claim 10, which further comprises brackets connecting said rail sections to one another.

12. The installation according to claim 1, wherein said supporting and guide rail is disposed in straight segments and curved segments between the mountain station and the valley station, and which further comprises strips of magnetically non-conducting material fastened on said supporting and guide rail at locations upstream of said curved segments in a travel direction from the mountain station to the valley station, and wherein said carriage carries at least one permanent magnet adapted to interact with said strips for braking said carriages upstream of the curved segments of said supporting and guide rail.

13. The installation according to claim 1, wherein said supporting and guide rail is disposed in straight segments and curved segments between the mountain station and the valley station, and which further comprises deflecting rollers supporting said supporting cable in said curved segments of said supporting and guide rail.

14. The installation according to claim 13, which further comprises a plurality of pylons supporting said supporting cable via said deflecting rollers, and struts attaching said supporting and guide rail to said supporting pylons.

15. The installation according to claim 13, which further comprises a plurality of struts supporting said supporting and guide rail on said supporting pylons in said curved segments.

* * * * *